United States Patent [19]

Senzaki et al.

[11] 4,348,675
[45] Sep. 7, 1982

[54] FM-CW RADAR SYSTEM FOR USE IN AN AUTOMOTIVE VEHICLE

[75] Inventors: Takaya Senzaki, Iruma; Eiji Murao, Asaka, both of Japan

[73] Assignee: Honda Giken Kogyo Kabushiki Kaisha, Tokyo, Japan

[21] Appl. No.: 171,149

[22] Filed: Jul. 22, 1980

[30] Foreign Application Priority Data

May 23, 1979 [JP] Japan .................................. 55-69198
Jul. 24, 1979 [JP] Japan .................................. 54/94104

[51] Int. Cl.³ .............................................. G01S 13/32
[52] U.S. Cl. .................................. 343/7 VM; 343/14
[58] Field of Search .............................. 343/7 VM, 14

[56] References Cited

U.S. PATENT DOCUMENTS

3,680,085 7/1972 Del Signore .......................... 343/14
4,101,888 7/1978 Heller et al. ..................... 343/7 VM Primary Examiner—T. H. Tubbesing
Attorney, Agent, or Firm—Irving M. Weiner; Pamela S. Burt; John L. Shortley

[57] ABSTRACT

An FM-CW type radar system, for use in an automotive vehicle, which is specifically designed with a signal processor of relatively simple construction having an improved capability of identifying an object, particularly a plurality of objects, to be identified in suurrounding traffic or road areas. The system is particularly effective in overcoming possible error in detection of the object(s) due to reflected or scattering waves from the road surface or the like as experienced in the general radar navigation system for detecting the approaching or interfering object(s) by the provision of incessant radar monitoring along with the path of travel of the vehicle equipped with the radar system so as to eventually maintain a safe relative distance and/or velocity of that vehicle with respect to the object(s) in the surrounding traffic or road areas.

3 Claims, 14 Drawing Figures

FM-CW RADAR SYSTEM FOR USE IN AN AUTOMOTIVE VEHICLE

FIELD OF THE APPLICATION

The present invention relates to an improved radar system, and more particularly to an FM-CW radar system for use in a self-propelled craft such as an automotive vehicle, etc.

BACKGROUND OF THE INVENTION

Recently, in attempting to provide safety means for the preparation of drivers and passengers of automotive vehicles and the like, a variety of systems have been developed for the control of a travel interval distance between two vehicles for the prevention of an accidental collision or contact. Such systems provide an electronic device such as a radar system adapted to be installed on the vehicle for the purpose of measuring a distance from the vehicle to another existing in the traffic or approaching toward the path of that vehicle or an obstacle on the road, and/or a relative velocity therewith, and when the vehicle comes within a dangerously close region wherein there is a possibility of collision or contact, the driver is then warned or the vehicle's brake is actuated, so as to eventually prevent a possible collision or contact from occurring.

Among such radar systems, commonly known types are: the two-frequency Doppler radar system adapted to measure an interval distance to an object and/or a relative velocity therewith by way of the Doppler frequency shift generated by a relative velocity from a radio wave beam emitted originally against an object and a reflected-to-return wave therefrom, the pulse radar system for measuring a distance to the object by determining a wave propagation time in a round or turnaround trip to and from the object, and the FM-CW type radar system for determining a distance to the objects from a beat frequency generated from a phase shift between an emitted wave and receiving waves. While the two-frequency Doppler radar system suffers from the disadvantage that it cannot function with respect to two objects having no relative velocity therebetween, the pulse radar system and the FM-CW type radar system can determine a distance between two objects with a zero relative velocity. Consequently, it is of course the latter systems that can be adapted to an object which is stationary or an obstacle where there is no relative velocity with respect to the moving source of emission of radio waves.

Furthermore, because the pulse radar system cannot practicably measure a distance smaller than the output pulse width from the system, it is essential to have an extremely small output pulse width to practice the measuring of a relatively short distance required. In view of such disadvantageous requirement, such a pulse radar system has an attendant technical difficulty in the design per se and in the technique of receiving reflected-to-return waves as well. In this respect, the FM-CW type radar system is in contrast advantageous in its relatively simple construction as well as its excellent controllability. Moreover, it can readily perform the measurement of an extremely small distance when compared with the pulse radar system.

To provide a better understanding of the present invention, the following is a general explanation of the fundamental principle of operation of the so-called FM-CW type radar system, to which the present invention is directed.

Figure 1:
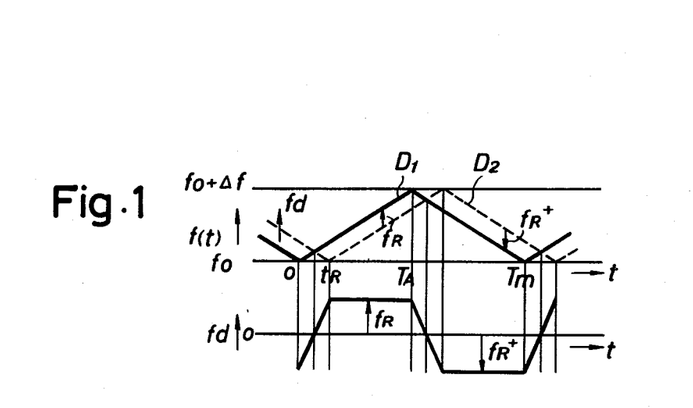
FIG. 1 is a schematic diagram showing the operating principle of the general FM-CW type radar system.

As typically shown in FIG. 1, when a radio wave $D_1$, having its oscillating frequency $f_o$ modulated by increasing to a level of $f_o + \Delta f$ and then descreasing back to $f_o$ at a time interval or cycle of Tm, is emitted against an object and then a reflected wave $D_2$ is received, there is obtained a phase shift between the two waves by a propagation time of $t_R$ to and from the object on the same timing basis (see the Equation 1 hereinbelow). With such phase shft, there is produced a beat frequency $f_R$, and the thus-obtained beat frequency $f_R$ is proportional to a propagation time $t_R$ or a distance X to and from the object as represented in the Equation 2 below, and consequently, it is thus possible to determine the distance X by measuring the magnitude of the beat frequency $f_R$. On the other hand, by obtaining a time lapse at the distance X to the object detected, a relative velocity Vr can now be determined from the Equation 3, below.

$$t_R = 2X/c \ldots \quad (1)$$

where, c represents a propagation velocity of a wave.

$$f_R = (2/Tm)\cdot \Delta f \cdot t_R \ldots \quad (2)$$

$$dX/dt = Vr \ldots \quad (3)$$

Figure 2:
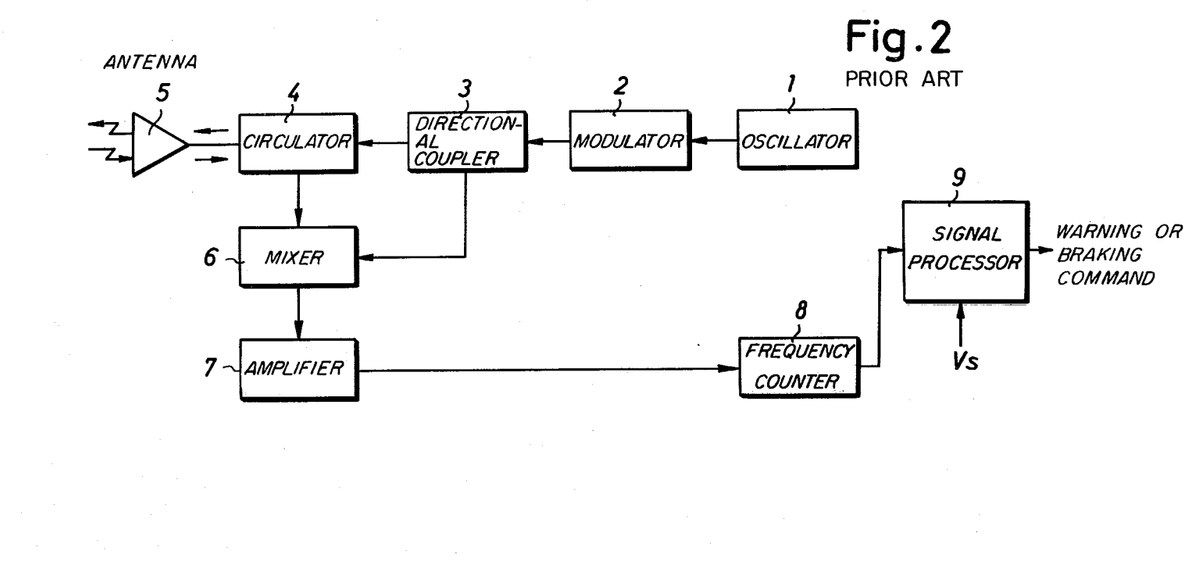
FIG. 2 is a block diagram showing the general construction of the conventional FM-CW type radar system for use in an automotive vehicle.

Now, referring to FIG. 2, there is shown the conventional FM-CW type radar system specifically designed to be installed on an automotive vehicle so that it may operate to detect an interval distance and a relative velocity between that vehicle and an object approaching or interfering therewith, to determine an appropriate or safety vehicle interval between the two in accordance with a predetermined function on the basis of the result of detection and the existing velocity signal of that vehicle, and to then decide in accordance with comparison of the thus-obtained safety interval and the existing actual interval distance between the two to produce a command as necessary for warning the driver of that vehicle or a command for actuating the brake of the vehicle, accordingly. More particularly, this FM-CW type radar system for use in the automotive vehicle is constructed to provide the steps of modulating the oscillating frequency $f_o$ from an oscillator 1 to a given frequency with a modulator 2, emitting the thus-modulated output from an antenna 5 through a directional coupler 3 and a circulator 4 to the object, receiving a reflected-to-return wave from the object and sending it through the circulator 4 to a mixer 6, mixing this reflected wave with a transmitted wave branched from the above mentioned directional coupler 3 so as to obtain beat frequencies $f_R$, amplifying the thus-obtained small beat frequency signals with a video signal amplifier 7 to a desired voltage level, thereafter sending thus-amplified signals to a frequency counter 8 so as to read out the frequencies thereof, and then supplying the thus-read value of the beat frequency to a signal processor 9 so as to determine the vehicle interval X and relative velocity Vr from the arithmetic operation set forth above. Concurrently, the existing appropriate safety vehicle interval Xs is determined in accordance with the predetermined function wherein the appropriate safety vehicle interval is previously stored with respect to an existing velocity signal Vs provided by a speedometer of the vehicle or the like and the calculated relative velocity Vr with respect to the object, the thus-obtained safety vehicle interval Xs is then compared with the existing actual interval X, and if Xs<X, a warning to the driver of the vehicle or a command for actuating the vehicle's brake is produced.

Figure 3:
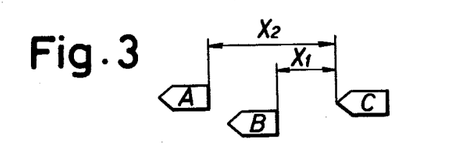
FIG. 3 is a schematic view showing a typical state of location of two objects in front of a vehicle equipped with the radar system.

According to the conventional FM-CW type radar system of typical construction as described above, it is very possible that the radar system may receive ghost signals upon which it would operate improperly, thus eventually degrading the performance of the system. More specifically, when there are a plurality of objects in the traffic around a vehicle in question, i.e., when there are two other vehicles A and B running in front of and at different respective distances from vehicle C in question equipped with the radar system, as exemplified in FIG. 3, the radar system would receive reflected waves from both vehicles A and B at the same time, thus producing beat frequencies from the mixture of two receiving waves from these vehicles. Under such circumstance, it would consequently be impossible to distinguish between vehicle A and vehicle B in the traffic. Incidentally, because there is actually a limit in the directivity of a radio wave beam to be emitted from the antenna installed on a vehicle, some of the reflected waves from the road surface or the like may very possibly be received by the antenna, even if it is substantially flat, thus resulting in beat frequencies from such reflected waves so as to produce possible phantom or ghost signals to show false images which really do not exist. On the other hand, if the conventional FM-CW type radar system was provided with an improved sensitivity of its receiver, it would naturally become too sensitive to the reflected waves from the road surface or the like, thus making it impossible to decide which is a correct and true signal.

In consideration of the above-discussed inevitable drawbacks or disadvantages inherent in the types of radar systems other than the FM-CW type radar system, as well as those of the conventional FM-CW type radar system, it would undoubtedly be advantageous to make the best use of the fundamental advantageous features of the FM-CW type radar system over others, yet avoiding the undesired shortcomings thereof.

SUMMARY OF THE INVENTION

The present invention is essentially directed to the provision of useful and improved means to measure and control a running interval and a relative velocity between one vehicle and others approaching or interfering with each other in the traffic, by way of the advantages particular to the improved FM-CW type radar system of the present invention over the conventional FM-CW type radar system, as well as over the other types of radar systems described hereinabove. More particularly, the present invention provides a solution of the ghost image problem as encountered in the conventional FM-CW type radar system so that precision may assuredly be attained in the detection of an object.

According to the present invention, there is provided an improved FM-CW type radar system for use in an automotive vehicle wherein a band of mixed beat frequencies corresponding to a distance to be detected by the radar system is divided into a plurality of fractional frequency bands with an even frequency band corresponding to each of the distance ranges so that mixed beat frequencies from the plurality of objects may be received separately from each other, and wherein a magnitude of each of the divided frequency components of the reflected waves from the road surface (which are reflected from a wide road surface range extending in front of the antenna of the vehicle) is previously set to be an appropriate reference level as a threshold value, respectively, whereby it is possible to take the only necessary information by subtraction of the thus previously-set reference level from each of the frequency components of the waves received as noises reflected from the road surface or the like.

For a more complete understanding of the present invention as well as further advantages thereof, reference may now be had to the following detailed description taken in conjunction with the accompanying drawings.

DETAILED DESCRIPTION OF THE PREFERRED EMBODIMENTS

Figure 4:
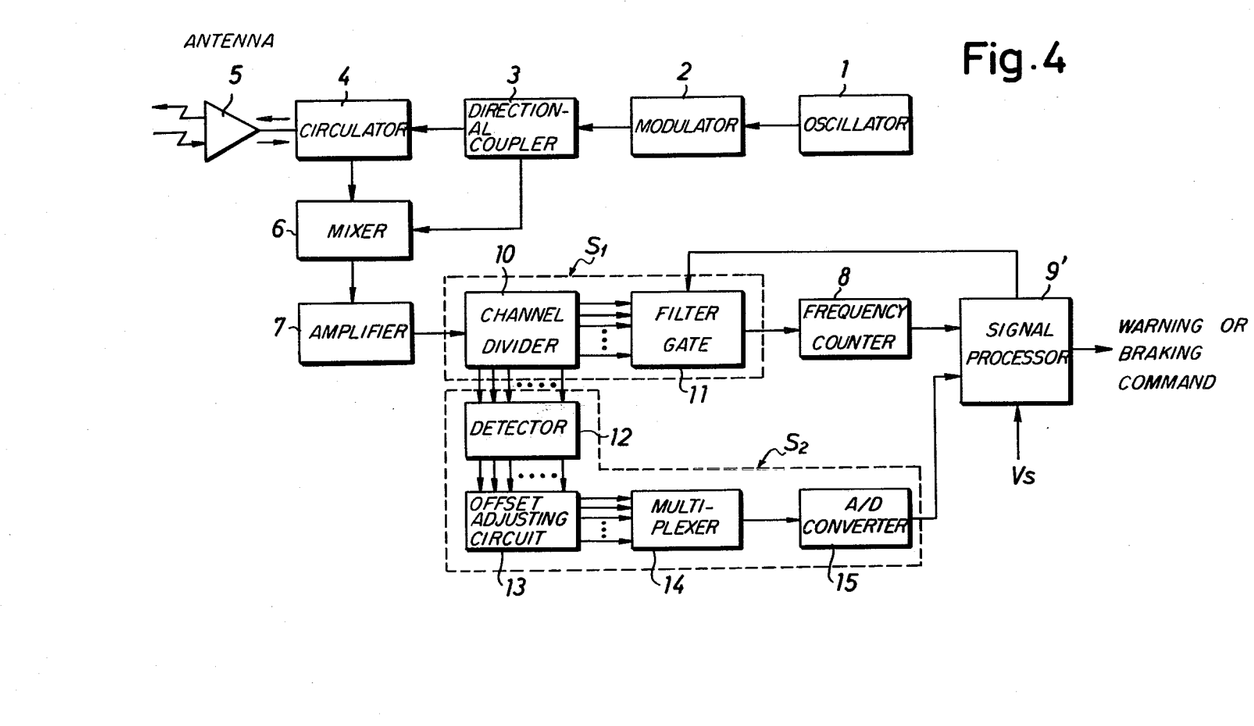
FIG. 4 is a block diagram showing a preferred embodiment of the present invention.

A preferred embodiment of the FM-CW type radar system for use in the automotive vehicle according to the present invention comprises, as typically shown in FIG. 4, in addition to the general construction of the conventional radar system shown in FIG. 2, a signal selection circuit $S_1$ including a channel divider 10 and a filter gate 11 connected as a unit in series between the video signal amplifier 7 and the frequency counter 8, and a channel selection circuit $S_2$ including a detector 12, an offset adjusting circuit 13, a multiplexer 14 and an analog-digital (A/D) converter 15 connected in series between the channel divider 10 and the signal processor (CPU) 9'.

Figure 5:
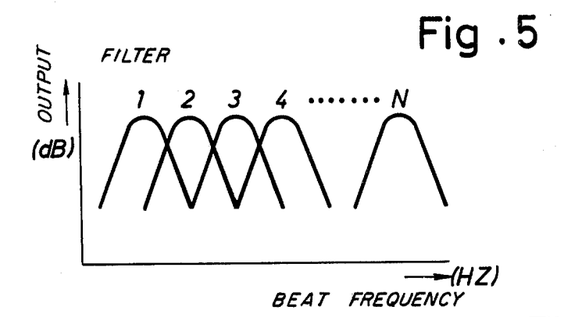
FIG. 5 is a graphic representation showing the output characteristics of a channel divider in the first embodiment of the invention.

With this construction of the FM-CW type radar system according to the present invention as described above, as in the conventional arrangement, a radio wave beam having its oscillating frequency modulated at a given frequency is emitted from an antenna 5, reflected-to-return waves are received by the same antenna 5 from a plurality of objects including the road surface, etc., and the received waves and the transmitted wave are then mixed by the mixer 6 so as to produce beat frequencies. Each of such beat frequencies is comprised of reflected waves received by the antenna 5 from a variety of objects. Because such signal is too weak for subsequent processing, it is then amplified up to a certain voltage level required by the following video amplifier 7, thereafter being fed to a channel divider 10, where it is analyzed for its component frequencies by means of a group of filters having channels of relatively narrow frequency band widths to cover the whole beat frequency band to be detected so as to provide corresponding beat frequency signals, as typically shown in FIG. 5. Next, each of the thus-obtained beat frequency signals is delivered to the filter gate 11 and the detector 12, respectively. At this moment, the filter gate 11 performs gating operation for selecting channels in response to commands from the signal processor (CPU) 9', thereby allowing only preselected channel outputs to pass therethrough so as to read their frequencies by way of the frequency counter 8 and feed its contents to the signal processor (CPU) 9', which operates to obtain the distance X and relative velocity Vr with respect to the specific object, and hence the appropriate safety vehicle interval Xs in light of the vehicle's speed of travel Vs at that moment, as described hereinabove, and compare the thus obtained values of X and Xs to produce a warning to the driver of that vehicle or a command for actuating the vehicle's brake, accordingly.

Figures 6, 7:
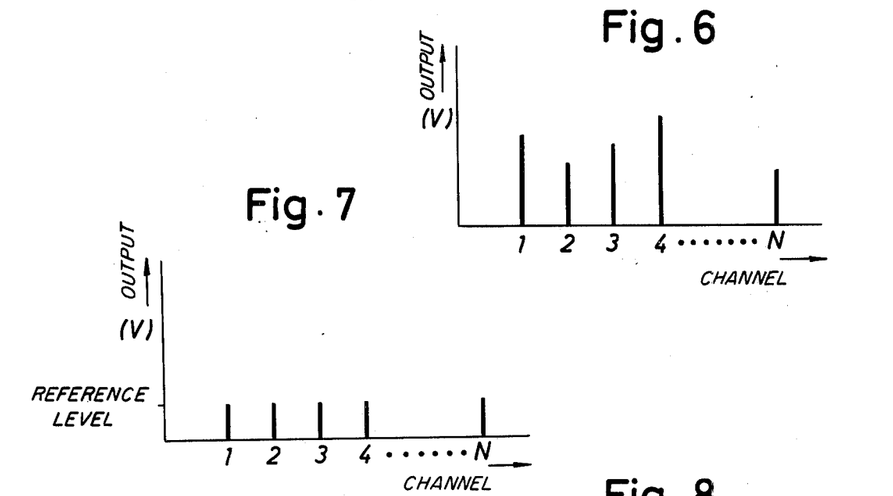
FIG. 6 is a graphic illustration showing the typical output characteristics of a detector as employed in the first embodiment shown in FIG. 4.
FIGS. 7 and 8 are similar graphic representations showing the output characteristics of an offset adjusting circuit when there is no object and when there is an object, respectively, also included in the same first embodiment.
Figure 8:
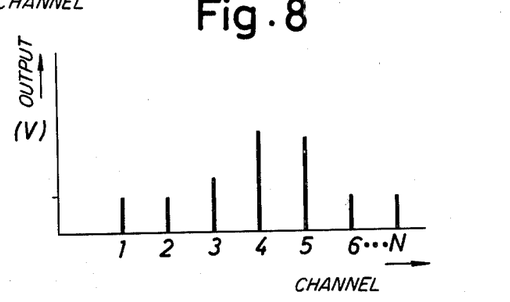

On the other hand, in order to supply the signal processor (CPU) 9' with information to decide the channel to be selected as described above, each of the channel outputs from the channel divider 10 is sent to the detector 12, where it is converted to a d.c. voltage, respectively. Theoretically, when there is no object on the road, there should exist the given reference level in each channel because there is no signal in existence, but actually, there is observed an unevenness in the resultant outputs of the individual channels owing to the reflected waves from the road surface. Consequently, it would be difficult to properly detect an object, if any existed. To overcome this problem, the output from the detector 12 is then sent to the offset adjusting circuit 13 for providing a preliminary offsetting adjustment so that channel outputs will turn out to be equivalent to each other as shown in FIG. 7. FIG. 8 is the graphic representation showing each channel output with the offset adjustment as described above, in the case that there are two objects A and B at different respective distances from the subject vehicle C. (See FIG. 3.) Then, each output from the offset adjusting circuit 13 is fed to the multiplexer 14, where it is shifted for sampling purposes in sequence beginning with the first channel and downwards, and then sent to the A/D converter 15 at the next stage where it is converted to a digital signal, thereafter being sent to the signal processor (CPU) 9'. This signal processor (CPU) 9' is designed to detect a channel corresponding to a selected object from the output level in each channel as given by the A/D converter 15 (in the case of FIG. 8, the channel 4), and to send out a command to open the filter gate 11 of the channel so selected, thereby to pick-up only the beat frequency signals of the thus-specified channel.

According to the FM-CW type radar system of the present invention designed for emitting a radio wave beam having its oscillating frequency modulated at a given frequency to the object and receiving reflected waves from that object so as to detect an interval distance and a relative velocity between a vehicle and the object by way of beat frequencies to be generated from the emitting and receiving waves, there is provided a signal extracting circuit adapted to analyze beat frequencies with each channel having an even frequency band width and to selectively pass the frequency signal of each channel there through, and a channel selection circuit adapted to adjust each channel frequency signal to be offset at the given level, thereafter having the channel occupied by the detecting object selected accordingly in terms of the output level of each channel. With such construction, the thus-attained beat frequencies generated from the mixing of the waves reflected from the plurality of objects in terms of the received signals may be divided into fractional frequencies, object by object, and thus, a determination of distance may be provided with respect to the individual objects. Also, there are further advantages provided by the present invention in that since such beat frequency components as generated by the reflected waves from the road surface or the like are cancelled as noises in advance with respect to the selection of channels, there is no chance of any detection error, and moreover, it is possible to have the sensitivity of the receiver increased substantially by virtue of such advantageous prior cancellation of such reflected waves so that a lower limit of detectable range of the object can be made as low as possible, etc.

Figure 9:
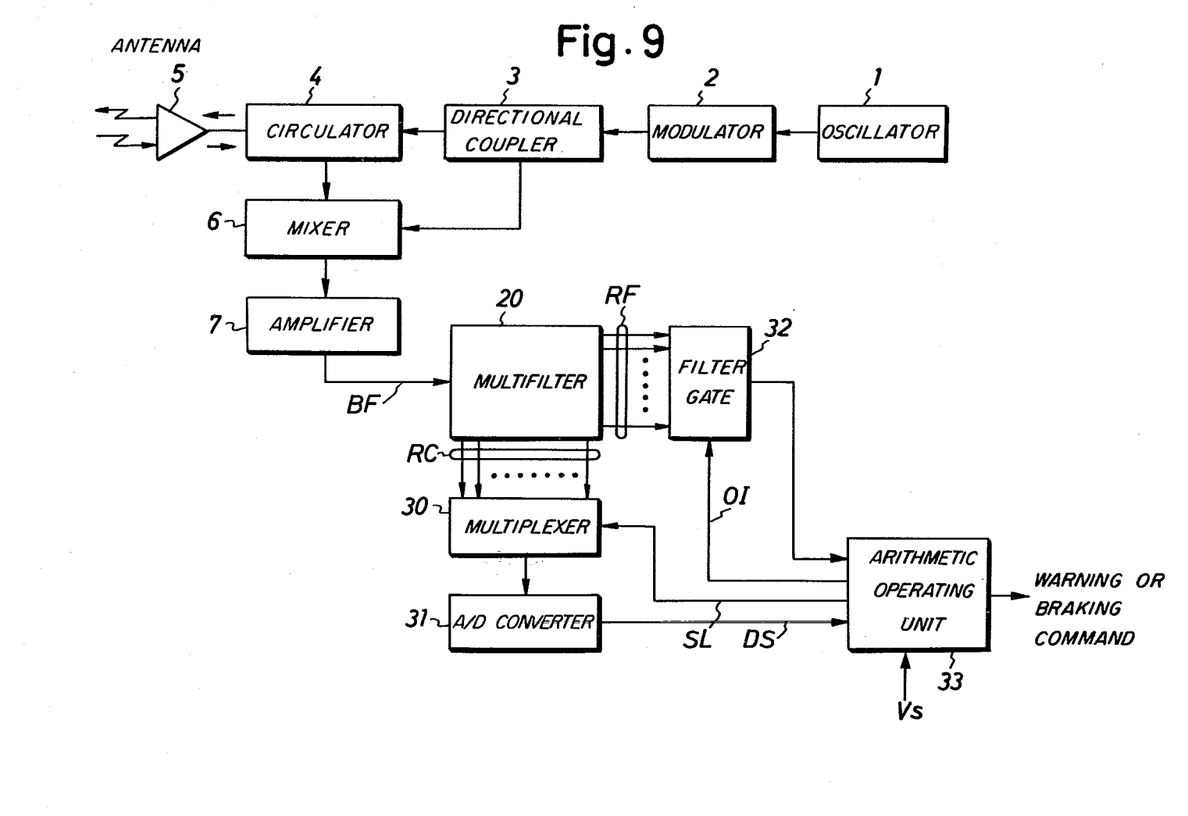
FIG. 9 is a block diagram showing another embodiment of the present invention.

With reference to FIG. 9, there is shown another embodiment of the invention wherein the FM-CW type radar system is specifically designed to cope with not only reflected waves from the road surface but also strong indefinite reflected noises from an upward slope or lateral wall structures, or the like.

Figure 10:
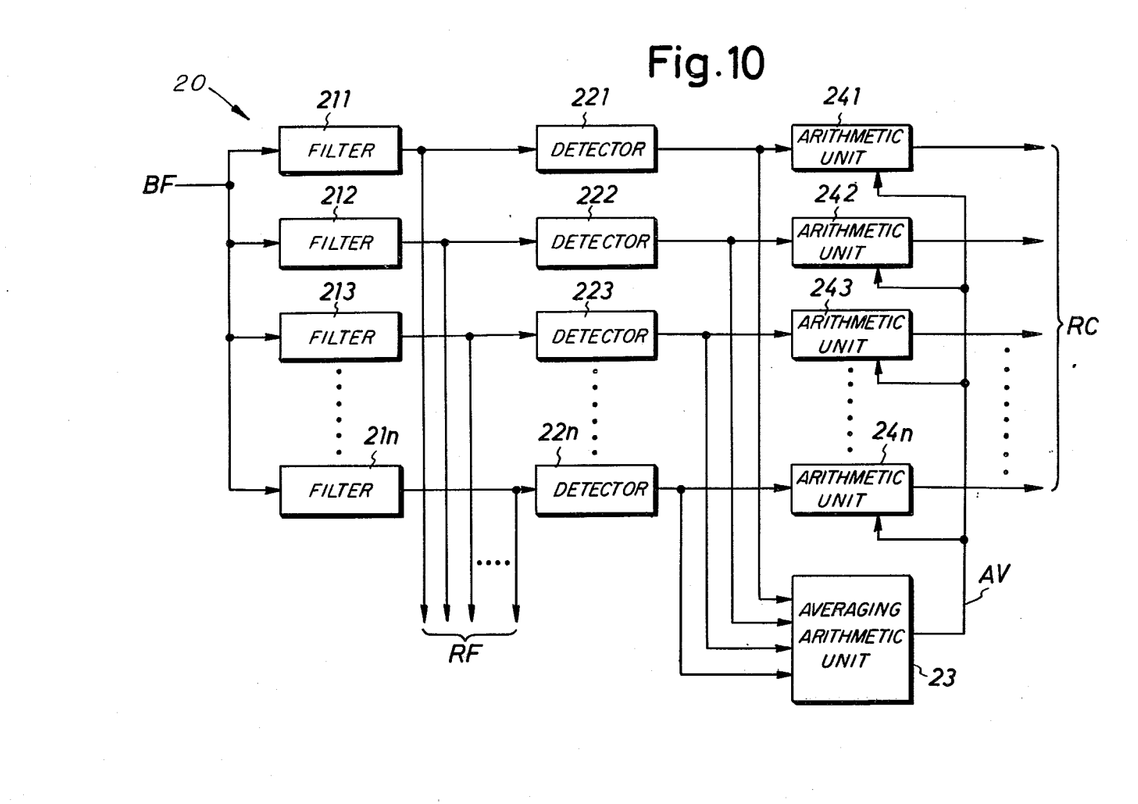
FIG. 10 is a block diagram showing an examplary construction of a multifilter as practiced in the invention.

According to this construction, there is provided the FM-CW type radar system for emitting radio wave beam having its oscillating frequency modulated at a given frequency from the antenna 5 and receiving reflected waves from an object by the antenna 5 to thereby detect an interval distance to the object by using beat frequency signals BF generated from the emitting and receiving waves, wherein there is provided a multifilter 20 adapted to pass the beat frequency signals BF through a plurality of constituent filters having predetermined even frequency bands and to detect individual filter output signals in their own frequency bands so as to be applied as outputs, a multiplexer 30 for selecting in sequence the detection outputs RC from the multifilter 20 so as to be applied as outputs in turn, an A/D converter 31 for converting the detection outputs RC selected by the multiplexer 30 to digital signals DS, and an arithmetic unit (a micro computer) 33 receiving the digital signals DS from the A/D converter 31, selectively receiving filter output signals RF from the multifilter 20 through the filter gate 32, and operating arithmetically in the manner as specified by the equations given hereinabove on the beat frequency signals BF applied as inputs thereto, thus providing a warning or a braking command. Multifilter 20 comprises, as typically shown in FIG. 10, a plurality of filters 21*l* through 21*n* adapted to provide outputs dividing the beat frequency signals BF from the amplifier 7 into n channels having specific characteristics as shown in FIG. 11, a plurality of detectors 21*l* through 22*n* to detect outputs from the filters 21*l* through 21*n*, respectively, an averaging arithmetic unit 23 to obtain an average value AV of outputs from the detectors 22*l* through 22*n*, and a plurality of arithmetic units 24*l* through 24*n* adapted to obtain a difference between the outputs from the detectors 22*l* through 22*n* and the average value AV from the averaging arithmetic unit 23 so as to produce resultant subtraction outputs, respectively.

Figure 11:
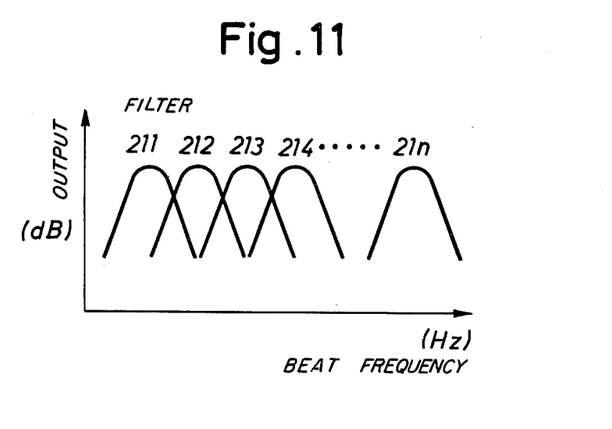
FIG. 11 is a graphic representation showing the examplary performances of component filters $21l$ through $21n$ within the multifilter 20.

With such construction, while there is attainable the beat frequency signals BF in the same manner as in the embodiments shown in FIGS. 2 and 4, these beat frequency signals BF are applied to the filters 21*l* through 21*n* within the multifilter 20, respectively, where they are divided in frequency (of the channels 1 through n) according to their own characteristics as schematically shown in FIG. 11, respectively. Each of the channel signals having the given frequency bands as obtained through the filters 21*l* through 21*n* are then applied as the filter output signals RF to the filter gate 32, as shown in FIG. 9, and also to the detectors 22*l* through 22*n* for detection. The thus-obtained detection outputs are now applied as inputs to the averaging arithmetic unit 23 as well as to the arithmetic units 24*l* through 24*n*, respectively. The averaging arithmetic unit 23 operates to obtain the total sum of the channel detection outputs, multiplied by a suitable factor, to provide the average value signal AV which is to be applied as an input to the arithmetic units 24*l* through 24*n*. These arithmetic units 24*l* through 24*n* operate to subtract the detection outputs from the above mentioned detectors 22*l* through 22*n* and the average value signal AV, the result of which is then applied as the detection outputs RC to the multiplexer 30 following in the next stage as shown in FIG. 9. The multiplexer 30 shifts in sequence the selected channels in accordance with the selection signal SL from the arithmetic unit 33 so as to be sampled accordingly, and then sends the selectively applied detection outputs to the A/D converter 31 for conversion to the digital signals DS, which are to be applied as inputs to the arithmetic unit 33. This arithmetic unit 33 accommodates such digital data of the detection outputs RC of each channel for conducting the arithmetic operation as specified in the equations given hereinabove, so as to determine an open gate to be selected and produce a gate opening command OI specifying a related channel to the filter gate 32, whereupon arithmetic unit 33 takes the filter output signals RF of the thus-opened channel so as to perform the action described above.

Figure 12:
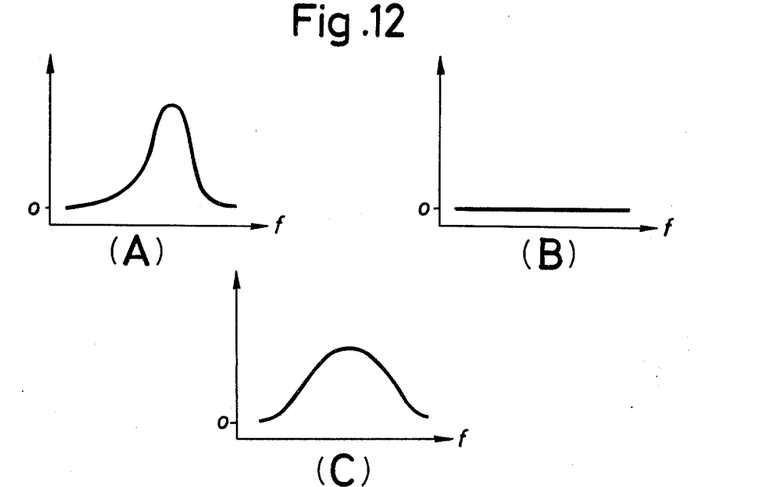
FIG. 12 is a graphic representation showing the distribution of frequencies from the multifilter as practiced in the invention.

The modulated signal in the FM-CW type radar system may be represented by way of frequency distribution as typically shown in waveforms A–C of FIG. 12. More specifically, in the case where there is an object in the traffic, it is represented with a pattern of a mountain shape having a peak in the middle thereof, the peak being a frequency corresponding to a distance to the object as shown in waveform A of FIG. 12. In contrast, when there is no object and thus no reflection presented therefrom, the frequency distribution is theoretically a flat line representing zero level extending throughout the whole frequency range as shown in waveform B of FIG. 12, and when there exists a reflection from an indefinite non-object, there is a representation of a relatively flat mountain shape as shown in waveform C of FIG. 12. It is noted that there is a peak represented in the frequency distribution irrespective of whether a reflected signal is from an object or from an indefinite non-object, and consequently, it is generally difficult to decide whether or not there is actually an object to be detected immediately from such peak representation. However, it is possible to check if there is a conspicuous frequency peak in contrast to other undulatory patterns of frequency distribution, from the typical graphic representation as shown, for a determination as to whether or not there is actually an object to be detected. This may lead to a conclusion of a high probability in the recognition of the objects in the traffic.

Figure 13:
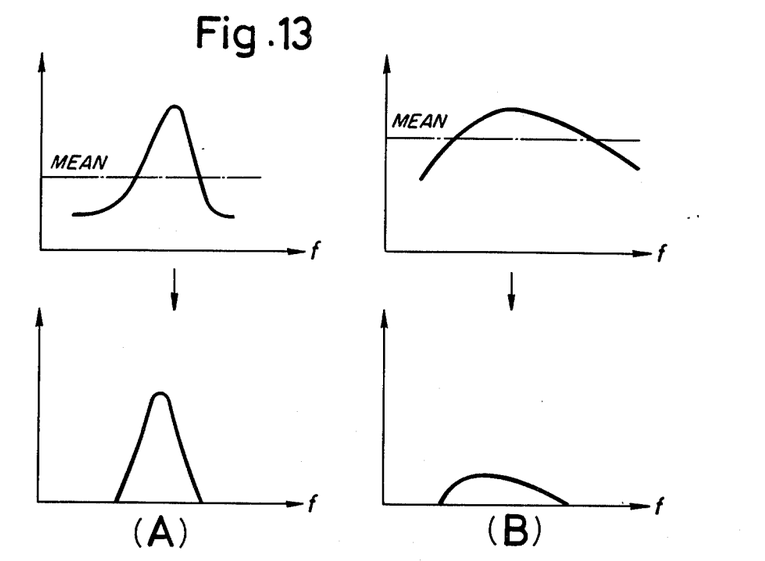
FIG. 13 is a graphic representation showing the principle of identification of objects according to the invention.
Figure 14:
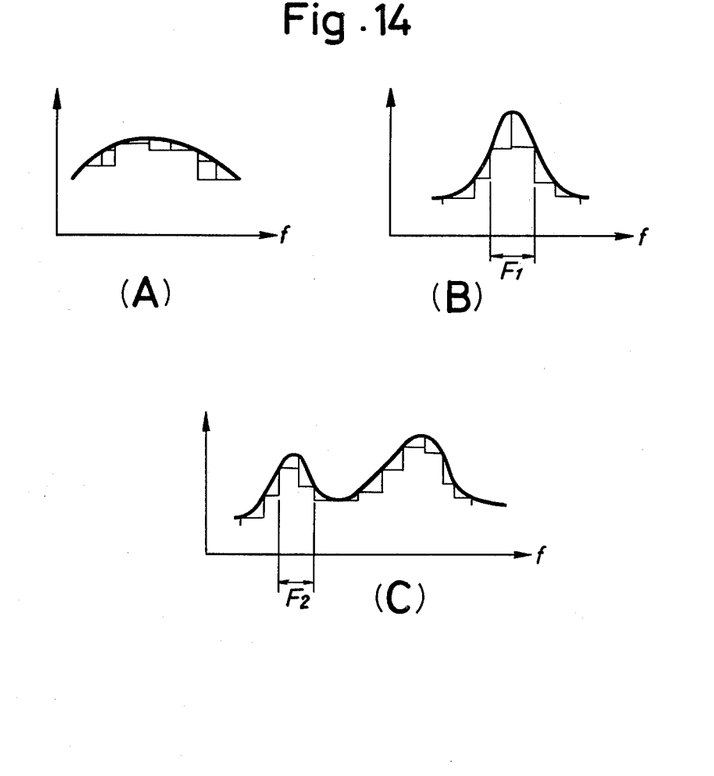
FIG. 14 also is a graphic representation showing the relationship between the characteristic curves of a detecting output and the state of an open gate as practiced in the invention.

In this connection, reviewing the frequency distribution of the multifilter 20 more closely in a comparative study of the case where there is an outstanding peak and also where there is no such peak, it is noted that even when the peak levels are equal, an average value in the case having the conspicuous peak is relatively small, while that of the case having no appreciable peak is large. Consequently, the peak level obtained from subtraction of such average value as noted hereinabove is found to be higher in the case having the notable peak as in waveform A of FIG. 13 than in the case having no appreciable peak as in waveform B of FIG. 13. On the other hand, with respect to the frequency distribution as viewed of the multifilter 20, the slope of a distribution curve is relatively related to an extent of standing of a peak in a mountain-shaped curve. In this respect, by noting whether a difference in the detection outputs between each channel and its adjacent one is greater or smaller than the predetermined value, it is now possible to determine whether the peak of a distribution curve is sharp or not. Now, referring to waveform A of FIG. 14, it is shown that there is a small difference in the detection outputs from the channels and that there is no open gate (filter gate 32), while waveform B of FIG. 14 shows the case that the above difference is greater in the frequency band $F_1$ and that the gate (filter gate 32) corresponding to that band is open. From the foregoing, it is possible to positively decide with an appropriately predetermined threshold setting whether or not there is an object to be detected.

On the other hand, waveform C of FIG. 14 represents the case where there are a plurality of objects (in this example, there are two) in the traffic. Under such a condition, it is possible to identify with priority a closer object by way of sequential detection of objects to satisfy the predetermined setting starting with lower frequency channels. In the case as shown in waveform C of FIG. 14, the filter gate 32 corresponding to the frequency band $F_2$ may be opened.

As fully described hereinabove, according to the improved FM-CW type radar system of the present invention, important advantages are attained in that a close object can be identified with priority to others when there are a plurality of objects in the traffic, and there is no risk of erroneous detection of indefinite objects such as an upward slope, a wall structure, etc. other than due objects to be detected.

It will be obvious to those skilled in the art that many other variations and modifications of the present invention could be made in addition to the above described preferred embodiments. For example, the FM-CW type radar system according to the present invention may likewise be installed in a vehicle so as to detect objects or obstacles in the back and/or in the lateral positions of the vehicle in substantially the same manner as for the detection of objects and obstacles in the direction of travel thereof.

What is claimed is:

1. An FM-CW type radar system for use in an automotive vehicle for emitting a radio wave beam having the oscillating frequency thereof modulated at a given frequency, receiving reflected-to-return waves from an object or objects to be detected and determining a distance to the object by way of beat frequency signals produced from the emitting and receiving waves, which comprises:

means for dividing said beat frequency signals into a plurality of equal fractional frequency bands and detecting the thus-divided beat frequency signals;

signal processing means for operating arithmetically in a predetermined manner to provide an appropriate safe vehicle interval on each signal component of said divided frequency signals, whereby a warning or a command for actuating the brake of said vehicle is produced in accordance with said appropriate or safe vehicle interval distance;

signal extraction circuit means for selectively passing a beat frequency having a given frequency band width channel-by-channel in the beat frequency signal system thereof; and channel selection circuit means for setting the frequency signal of each said channel at an appropriate reference level as a threshold value and offsetting each of said frequency signals set at said reference level, and thereafter optionally selecting the channel corresponding to the object to be detected in accordance with the output level of each said channel.

2. An FM-CW type radar system for use in an automotive vehicle for emitting a radio wave beam having the oscillating frequency thereof modulated at a given frequency, receiving reflected-to-return waves from an object or objects to be detected and determining a distance to the object by way of beat frequency signals produced from the emitting and receiving waves, which comprises:

means for dividing said beat frequency signals into a plurality of equal fractional frequency bands and detecting the thus-divided beat frequency signals;

signal processing means for operating arithmetically in a predetermined manner to provide an appropriate safe vehicle interval on each signal component of said divided frequency signals, whereby a warning or a command for actuating the brake of said vehicle is produced in accordance with said appropriate or safe vehicle interval distance;

multifilter means for passing said beat frequency signals through a plurality of filters having an equal frequency band and detecting said filter output signals having said equal frequency band so as to be applied as outputs therefrom;

multiplexer means for sequentially selecting the detection outputs from said multifilter means so as to be applied as outputs therefrom;

analog-digital converter means for converting said detection outputs selected by said multiplexer means to digital signals; and arithmetic operating means for receiving said digital signals from said analog-digital converter means, selecting said filter outputs through filter gate means so as to be applied as inputs thereto and arithmetically operating to produce a warning or a command for actuating the brake of the vehicle.

3. An FM-CW type radar system according to claim 2 wherein:

said multifilter means comprises a plurality of constituent filters corresponding to said given frequency bands, a plurality of detector means for respectively detecting the outputs from said constituent filters, averaging arithmetic means for obtaining an average value of said detector outputs, and a plurality of arithmetic means for obtaining a difference between each of said detector outputs and said average value so as to be applied as outputs therefrom.

* * * * *